(12) United States Patent
Gordon

(10) Patent No.: US 12,269,421 B1
(45) Date of Patent: *Apr. 8, 2025

(54) LOCKING BOOT FOR VEHICLE WHEEL

(71) Applicant: Mike Gordon, Oceanside, NY (US)

(72) Inventor: Mike Gordon, Oceanside, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,068

(22) Filed: Dec. 21, 2023

Related U.S. Application Data

(63) Continuation of application No. 18/196,399, filed on May 11, 2023, now Pat. No. 11,884,234, which is a continuation of application No. 16/916,708, filed on Jun. 30, 2020, now Pat. No. 11,661,030, which is a continuation of application No. 15/972,679, filed on May 7, 2018, now Pat. No. 10,696,270, which is a continuation of application No. 15/710,083, filed on Sep. 20, 2017, now Pat. No. 9,963,105.

(60) Provisional application No. 62/534,444, filed on Jul. 19, 2017.

(51) Int. Cl.
*B60R 25/09* (2013.01)
*B60R 25/23* (2013.01)

(52) U.S. Cl.
CPC .............. *B60R 25/09* (2013.01); *B60R 25/23* (2013.01)

(58) Field of Classification Search
CPC ......... B60R 25/00; B60R 25/09; B60R 25/20; Y10T 70/5841; Y10T 70/40
USPC .......... 70/14, 19, 225, 226; 180/287; 188/32
See application file for complete search history.

(56) References Cited

U.S. PATENT DOCUMENTS

| | | | |
|---|---|---|---|
| 1,376,114 | A | 4/1921 | Raney |
| 1,488,893 | A | 4/1924 | Plouffe |
| 2,960,857 | A | 11/1960 | Winter |
| 3,868,837 | A | 3/1975 | Quimby |
| 3,907,072 | A | 9/1975 | Shafer |
| 4,723,426 | A | 2/1988 | Beaudoin |

(Continued)

FOREIGN PATENT DOCUMENTS

| | | |
|---|---|---|
| JP | 2002308074 A | 10/2002 |
| WO | 1998/12083 A1 | 3/1998 |

OTHER PUBLICATIONS

Article titled "SmartBoots coming to Salt Lake City Streets", posted on www.KSL.com on Mar. 10, 2011.

(Continued)

*Primary Examiner* — Suzanne L Barrett
(74) *Attorney, Agent, or Firm* — Shore IP Group, PLLC; Sean R. Wilsusen

(57) ABSTRACT

A vehicle locking boot includes a horizontal support arm and a first vertical support arm extending from the horizontal support arm. The first vertical support arm includes a front engagement protrusion extending therefrom. A receiving sleeve extends from the horizontal support arm at a base of the first vertical support arm. A horizontal extension portion is coupled to the horizontal support arm. A second vertical support arm extends from the horizontal extension portion along a direction orthogonal to the upper surface of the horizontal support arm. The second vertical support arm includes a rear engagement protrusion extending therefrom. The front engagement protrusion faces the rear engagement protrusion. A keypad is disposed on the first engagement portion. The keypad is configured to lock and unlock the horizontal extension portion. A lug nut blocking plate is coupled to the first vertical support arm above the first engagement protrusion.

10 Claims, 5 Drawing Sheets

(56) References Cited

U.S. PATENT DOCUMENTS

| | | |
|---|---|---|
| 4,819,462 A | 4/1989 | Apsell |
| 5,315,848 A | 5/1994 | Beyer |
| 5,375,442 A | 12/1994 | Hammer |
| 5,385,038 A | 1/1995 | Walker |
| 5,678,433 A | 10/1997 | Riccitelli |
| 5,829,285 A | 11/1998 | Wilson |
| 5,829,286 A | 11/1998 | Noe et al. |
| 5,862,688 A | 1/1999 | Oedegaard |
| 5,865,048 A | 2/1999 | Beavers et al. |
| 5,873,275 A | 2/1999 | Lukich |
| 6,032,497 A | 3/2000 | Fulcher et al. |
| D542,122 S | 5/2007 | Mechalchuk et al. |
| D567,062 S | 4/2008 | Meyer |
| 7,594,415 B1 | 9/2009 | Wu |
| 7,731,068 B2 | 6/2010 | Scicluna |
| 7,731,088 B2 | 6/2010 | Moynihan et al. |
| 7,843,321 B2 | 11/2010 | Marchasin et al. |
| 7,950,570 B2 | 5/2011 | Marchasin et al. |
| 7,988,045 B2 | 8/2011 | Connell et al. |
| 7,988,046 B2 | 8/2011 | Moynihan et al. |
| 8,099,984 B2 | 1/2012 | Wu |
| 8,219,442 B2 | 7/2012 | Johnson et al. |
| 9,262,749 B2 | 2/2016 | Johnson et al. |
| 9,963,105 B1 | 5/2018 | Gordon |
| 10,507,792 B1 | 12/2019 | Gordon |
| 10,696,270 B2 | 6/2020 | Gordon et al. |
| D906,080 S | 12/2020 | Gordon |
| D926,548 S | 8/2021 | Gordon |
| 2007/0245783 A1 | 10/2007 | Fulcher et al. |
| 2009/0188284 A1 | 7/2009 | Mechalchuk |
| 2010/0108448 A1 | 5/2010 | Wyers |
| 2011/0083481 A1 | 4/2011 | Cheatham |
| 2011/0226022 A1 | 9/2011 | Caldwell |
| 2012/0215595 A1 | 8/2012 | Johnson et al. |
| 2012/0215596 A1 | 8/2012 | Johnson et al. |
| 2012/0260702 A1 | 10/2012 | Jones |
| 2013/0226795 A1 | 8/2013 | Hopper et al. |
| 2020/0216020 A1 | 7/2020 | Gordon |

OTHER PUBLICATIONS

Co-Pending U.S. Appl. No. 15/710,083, filed Sep. 20, 2017.

File History for Ex-Parte Reexamination No. 90/014,183.

Paylock Modern Parking Solutions and Smart Boot, "Smartbooting" [online at the internet<URL: https://paylock.com/]. [Last Visited Sep. 20, 2017].

Product information webpage for Coochleer Car Wheel Lock Anti Theft Tire Lock Clamp Boot Tire Claw Parking Car Truck RV Boat Trailer: Automotive, accessed Aug. 1, 2018 at :https://www.amazon.com/dp/B0725RFVTK/ref=sspa_dk_detail_2?psc=1&pd_rd_i=B0725RFVTK&pd_rd_wg=R4Mz1&pd_rd_r=H56CCZ90T4WP1BE97H3D&pd_rd_w=5KEc5, referencing a "Date First Available" of Apr. 13, 2017.

Product information webpage for Heavy Duty Wheel Lock, accessed via Internet archive: Wayback Machine (https://archive.org/web/) for http://www.equipment lock.com as publicaly viewable on May 4, 2012.

Product User Manual for Fullstop Security Centurian Wheel Clamp, Model FCWC10-7, Rev. B 07-07, copyright 2007.

LOCKING BOOT FOR VEHICLE WHEEL

CROSS-REFERENCE TO RELATED APPLICATION

This application is a continuation of U.S. patent application Ser. No. 18/196,399, filed on May 11, 2023, which is a continuation of U.S. patent application Ser. No. 16/916,708, filed on Jun. 30, 2020, and issued as U.S. Pat. No. 11,661,030, which is a continuation of U.S. patent application Ser. No. 15/972,679, filed on May 7, 2018, and issued as U.S. Pat. No. 10,696,270, which is a continuation of U.S. patent application Ser. No. 15/710,083, filed on Sep. 20, 2017, and issued as U.S. Pat. No. 9,963,105, which claims priority to U.S. Provisional Patent Application No. 62/534,444, filed on Jul. 19, 2017, the disclosure of which is incorporated by reference herein in its entirety.

FIELD OF THE INVENTION

The present invention relates to a locking boot for a vehicle wheel. One or more exemplary embodiments of the present invention provide a locking boot for a vehicle wheel including an oversized lug nut cover and pad.

BACKGROUND

Parking enforcement often involves the use of identifying one or more vehicles illegally occupying a particular parking space or area and towing said vehicle. Further, vehicle tags registered to an owner who owed substantial fees in unpaid parking tickets. Fines may be increased substantially for repeat violators who are termed scofflaws. Scofflaws may be individuals who repeatedly violate a summons. Thus, vehicles registered to such owners may be towed to a storage location until back fines are paid the towed vehicle is replaced. An alternative approach is to utilize a vehicle locking boot which attaches to a vehicle's wheel and will prevent said vehicle from being moved until any related back fines are paid.

A vehicle locking boot may be applied to at least one wheel of a vehicle registered to a scofflaw or to a vehicle parked in an illegal area. The vehicle locking boot may eliminate the need to tow the vehicle, which saves time and money for both the vehicle owner and the municipality in which the vehicle is located. Such vehicle locking boots may be released after a fine is paid and the released vehicle locking boot may be returned to a management company without the vehicle ever being towed.

SUMMARY

According to an exemplary embodiment of the present invention, a vehicle locking boot includes a horizontal support arm and a first vertical support arm extending from the horizontal support arm along a direction orthogonal to an upper surface the horizontal support arm. The first vertical support arm includes a front engagement protrusion extending therefrom. A receiving sleeve extends from the horizontal support arm at a base of the first vertical support arm along a direction parallel to an extending direction of the horizontal support arm. A horizontal extension portion is coupled to the horizontal support arm. A second vertical support arm extends from the horizontal extension portion along the direction orthogonal to the upper surface of the horizontal support arm. The second vertical support arm includes a rear engagement protrusion extending therefrom. The front engagement protrusion faces the rear engagement protrusion. A keypad is disposed on the first vertical support arm. The keypad is configured to lock and unlock the horizontal extension portion. A lug nut blocking plate is coupled to the first vertical support arm above the front engagement protrusion.

According to an exemplary embodiment of the present invention, the lug nut blocking plate may include a lug nut blocking pad disposed on lug nut blocking plate.

According to an exemplary embodiment of the present invention, the lug nut locking plate may have an octagonal shape.

According to an exemplary embodiment of the present invention, the horizontal extension portion may be coupled to an internal track formed in the horizontal support arm. The horizontal extension portion may be configured to slide along the internal track to move the rear engagement protrusion to varying distances from the front engagement protrusion.

According to an exemplary embodiment of the present invention, a distal end of the horizontal extension portion with respect to the second vertical supporting arm may be concealed within the receiving sleeve when the front engagement protrusion is in contact with the rear engagement protrusion.

According to an exemplary embodiment of the present invention, the horizontal support arm may have a first thickness along the direction orthogonal to the upper surface of the horizontal support arm. The receiving sleeve may have a second thickness along the direction orthogonal to the upper surface of the horizontal support arm. The second thickness may be less than the first thickness.

According to an exemplary embodiment of the present invention, the upper surface of the horizontal support arm may extend along a first horizontal plane. An upper surface of the receiving sleeve may extend along a second horizontal plane. The first horizontal plane may be spaced apart from the second horizontal plane along the direction orthogonal to the upper surface of the horizontal support arm.

According to an exemplary embodiment of the present invention, the first vertical support arm may form a 90° angle with the horizontal support arm.

According to an exemplary embodiment of the present invention, a diameter of the lug nut blocking plate may be at least 10 inches.

According to an exemplary embodiment of the present invention, a diameter of each of the front engagement protrusion at a first end of the front engagement protrusion opposite the rear engagement protrusion may be at least 2 inches. A diameter of the rear engagement protrusion may taper to 1 inch at a second end of the front engagement protrusion facing the rear engagement protrusion.

BRIEF DESCRIPTION OF THE FIGURES

The above and other features of the present invention will become more apparent by describing in detail exemplary embodiments thereof, with reference to the accompanying drawings, in which.

DETAILED DESCRIPTION

Figure 1:
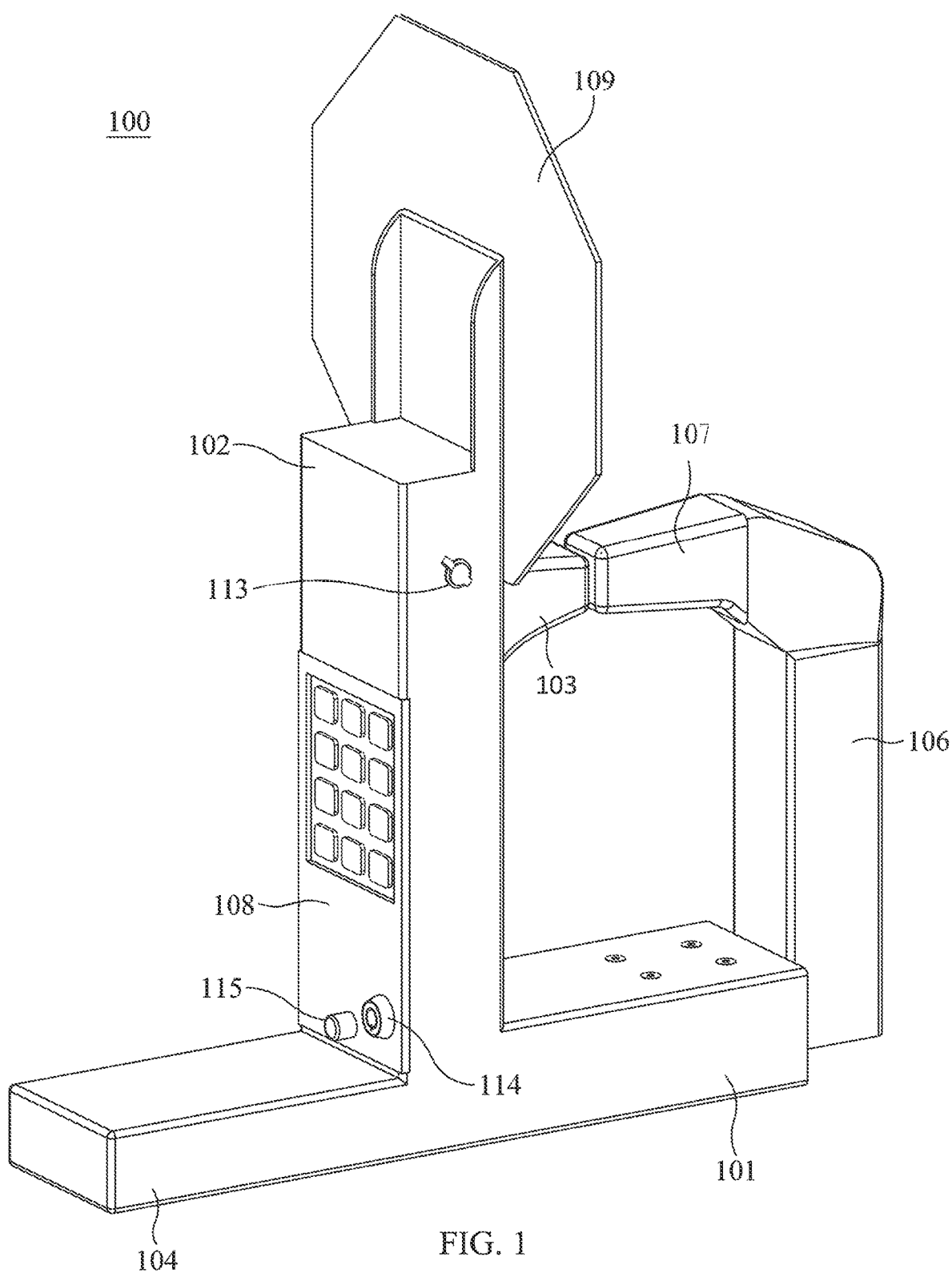
FIG. 1 illustrates an angled side view of a vehicle locking boot according to an exemplary embodiment of the present invention.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

Figure 2:
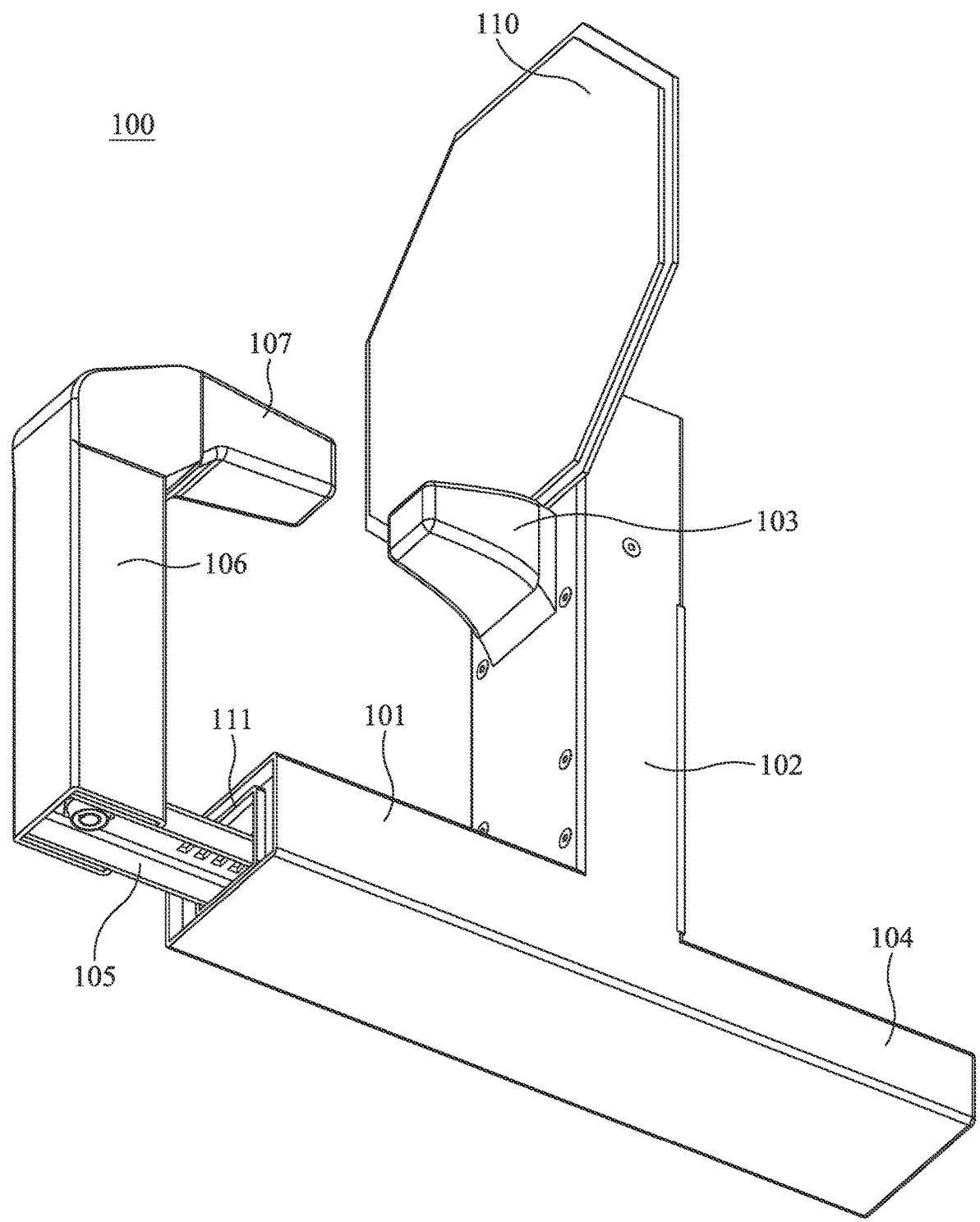
FIG. 2 illustrates an angled side view of a vehicle locking boot according to an exemplary embodiment of the present invention.
Figure 3:
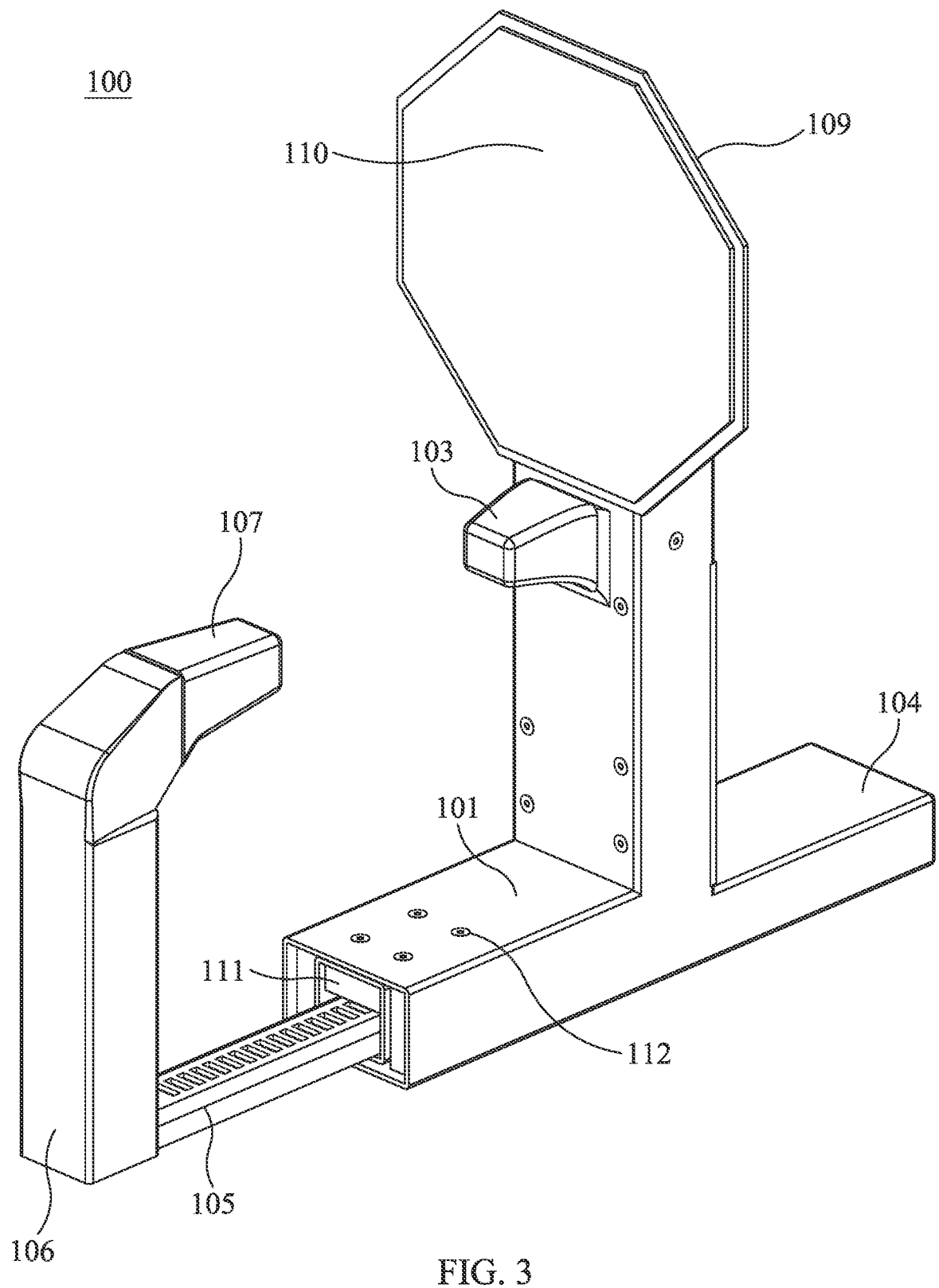
FIG. 3 illustrates an angled side view of a vehicle locking boot according to an exemplary embodiment of the present invention.
Figure 4:
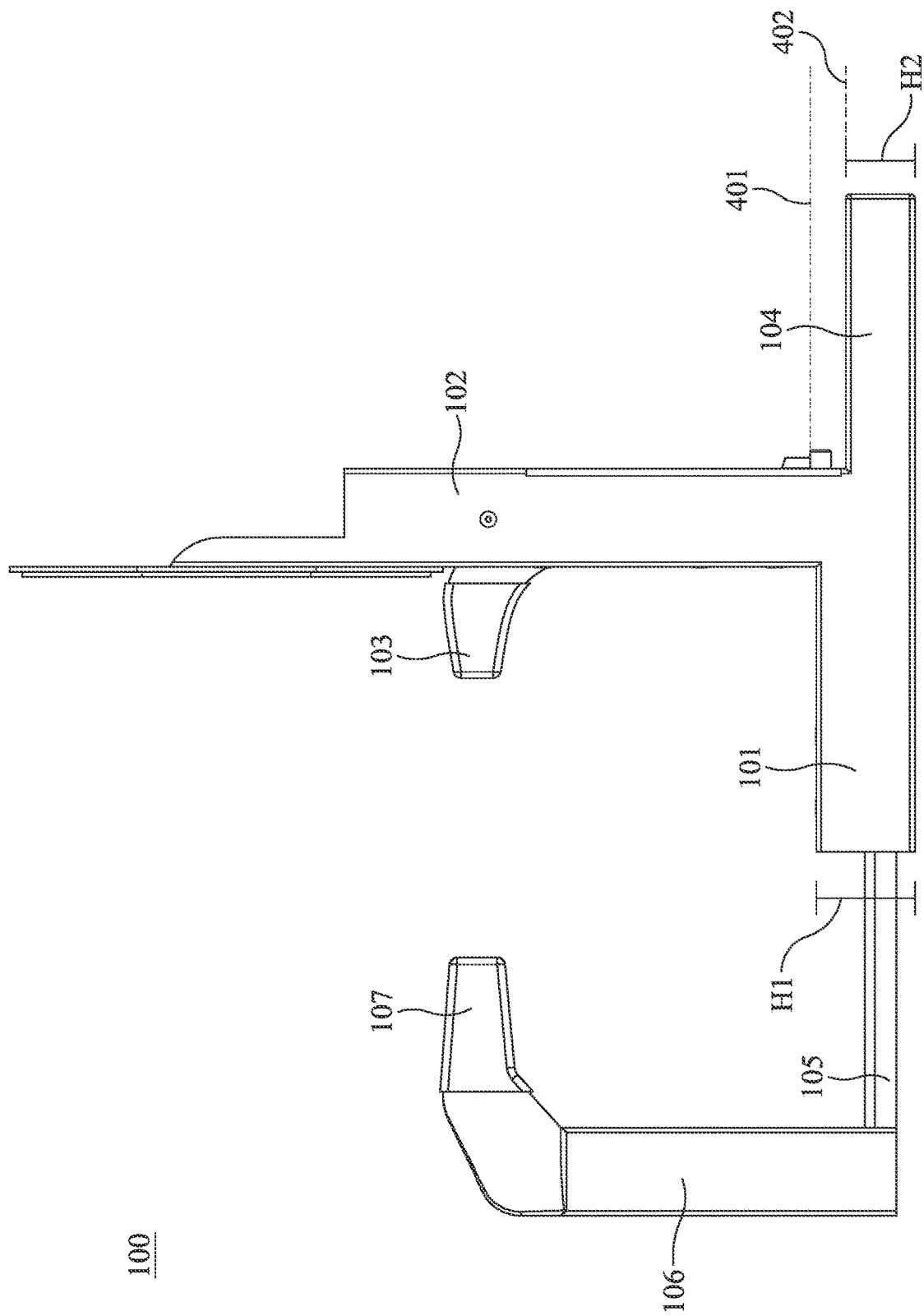
FIG. 4 illustrates a side view of a vehicle locking boot according to an exemplary embodiment of the present invention.
Figure 5:
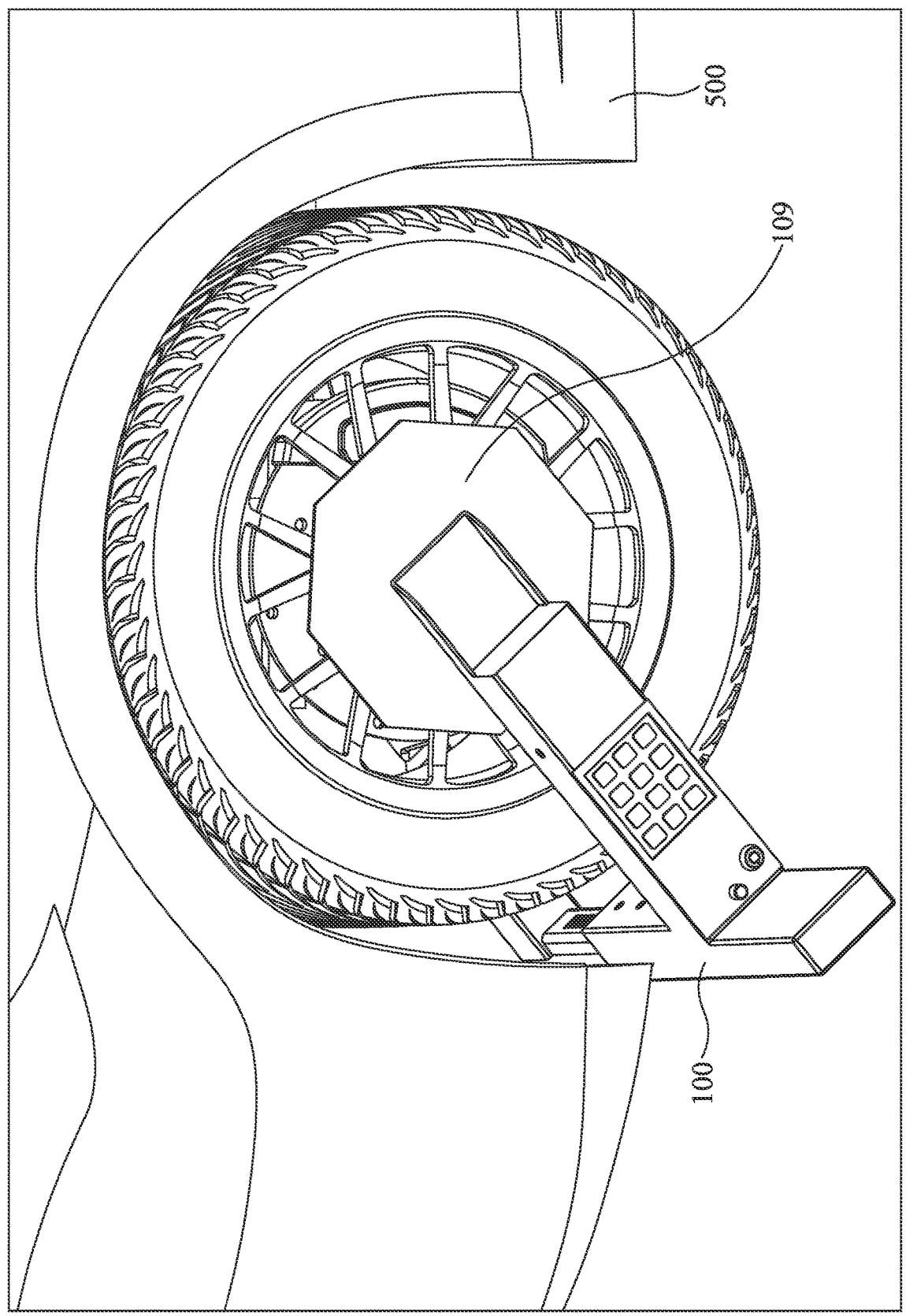
FIG. 5 illustrates a view of a vehicle locking boot according to an exemplary embodiment of the present invention coupled to a vehicle wheel.

FIG. 1 illustrates an angled side view of a vehicle locking boot according to an exemplary embodiment of the present invention. FIG. 2 illustrates an angled side view of a vehicle locking boot according to an exemplary embodiment of the present invention. FIG. 3 illustrates an angled side view of a vehicle locking boot according to an exemplary embodiment of the present invention. FIG. 4 illustrates a side view of a vehicle locking boot according to an exemplary embodiment of the present invention. FIG. 5 illustrates a view of a vehicle locking boot according to an exemplary embodiment of the present invention coupled to a vehicle wheel.

Referring to FIGS. 1 to 5, according to an exemplary embodiment of the present invention, a vehicle locking boot 100 may include an oversized lug nut blocking plate (e.g., a lug nut blocking plate 109) and pad (e.g., a lug nut blocking pad 110). The lug nut blocking plate 109 and pad 110 may be approximately ten inches in diameter, and may have a substantially octagonal shape. Thus, the lug not blocking plate 109 and pad 110 may be dimensioned, shaped and positioned to prevent tampering with the vehicle locking boot 100 by preventing lug nuts of a locked vehicle (e.g., vehicle 500) from being removed.

According to an exemplary embodiment of the present invention, a vehicle locking boot 100 may include relatively wide front and rear engagement protrusions (e.g., a front engagement protrusion 103 and a rear engagement protrusion 107) configured to be inserted into inner and outer indentations of a wheel. The engagement protrusions may be approximately two inches in diameter, and may taper to approximately one inch in diameter at innermost points of the engagement protrusions which face each other at an inner portion of a wheel (e.g., approximately behind the lug nuts of the vehicle). Upward projecting supporting arms (e.g., a first vertical support arm 102 and a second vertical support arm 106) of each of the engagement protrusions (the engagement protrusions may project horizontally) and the engagement protrusions may be formed as a single continuous member without weld joints. Thus, the engagement protrusions may be substantially rigid such that they cannot be easily tampered with or broken away from the vehicle locking boot through an application of force to the engagement protrusions or corresponding supporting arms.

The supporting arms and the engagement protrusions may be dimensioned, shaped and positioned such that tips of the engagement protrusions come into contact with each other when the vehicle locking boot 100 is fully closed, and the engagement protrusions may become separated from each other when the vehicle locking boot 100 is opened (e.g., to lock the vehicle locking boot to a wheel). However, dimensions of a wheel to which the vehicle locking boot 100 is attached may vary, and thus the engagement protrusions may be separated from each other even when the vehicle locking boot 100 is locked to a wheel of a vehicle.

A first engagement protrusion (e.g., a front engagement protrusion 103) coupled to a first vertical support arm (e.g., a first vertical support arm 102) opposite the lug nut blocking plate 109 may be moved away from a second engagement protrusion (e.g., a rear engagement protrusion 107) coupled to a second vertical supporting arm (e.g., a second vertical support arm 106) immediately below the lug nut locking plate 109 by way of a horizontal extension portion coupled to the first vertical support arm. The horizontal extension portion may slide through a track immediately below the second vertical supporting arm. The horizontal extension portion 105 may move in and out of a receiving sleeve 104 which is fully enclosed and is positioned approximately below the lug nut blocking plate 109. Thus, a distal end of the horizontal extension portion 105 is not exposed to an outside of the vehicle locking boot, which may prevent damage to the horizontal extension portion, and may reduce an amount of maintenance (e.g., greasing and cleaning) of the horizontal extension portion and the track. An upper surface of the receiving sleeve 104 may be in a different horizontal plane (e.g., a first horizontal plane 401) than an upper surface of a horizontal support arm (e.g., a horizontal support arm 101) coupled to the second vertical supporting arm (e.g., a second vertical support arm 106) on an opposite side of the second vertical supporting arm from the horizontal support arm 101. For example, an upper surface of the receiving sleeve 104 may be below the upper surface of the horizontal support arm 101, which may reduce a size and weight of the overall vehicle locking boot, while still protecting the horizontal extension portion.

According to an exemplary embodiment of the present invention, the first vertical support arm may form substantially a ninety degree angle with the horizontal support arm.

The vehicle locking boot may be unlocked and removed by entering a code into key pad, unlocking the boot, and sliding the engagement protrusions away from each other to remove the vehicle locking boot from the wheel.

According to an exemplary embodiment of the present invention, the vehicle locking boot 100 may be formed of steel or another rigid metal, and may include a relatively small number of weld joints, which may prevent one or more portions of the vehicle locking boot from being tampered with or broken off through an application of force. For example, each of the support arms described herein may have a hollow, tubular steel structure to maximize strength, while minimizing weight, thus allowing the vehicle locking boot 100 described herein to be easily locked to a vehicle's wheel without being damaged or broken off through an application of mechanical force or through tampering with by an owner of a vehicle.

According to an exemplary embodiment of the present invention, the vehicle locking boot 100 may include countersunk screws 112, a charging port 113 for charging to key pad 108 or any other connected electronic devices, a lock 114 and a release button 115 for releasing the lock 114 when the release button 115 is depressed after a correct unlock code is entered into the keypad 109.

According to an exemplary embodiment of the present invention, a vehicle locking boot 100 includes a horizontal support arm 101 and a first vertical support arm 102 extending from the horizontal support arm 101 along a direction orthogonal to an upper surface the horizontal support arm 101. The first vertical support arm 102 includes a front engagement protrusion 103 extending therefrom. A receiving sleeve 104 extends from the horizontal support arm at a base of the first vertical support arm 102 along a direction parallel to an extending direction of the horizontal support arm 101. A horizontal extension portion 105 is coupled to the horizontal support arm 101. A second vertical support arm 106 extends from the horizontal extension portion 105 along the direction orthogonal to the upper surface of the horizontal support arm 101. The second vertical support arm 106 includes a rear engagement protrusion 107 extending therefrom. The front engagement protrusion 103 faces the rear engagement protrusion 107. A keypad 108 is disposed on the first vertical support arm 102. The keypad 108 is configured to lock and unlock the horizontal extension portion 105. A lug nut blocking plate 109 is coupled to the first vertical support arm 102 above the front engagement protrusion 103.

According to an exemplary embodiment of the present invention, the lug nut blocking plate 109 may include a lug nut blocking pad 110 disposed on lug nut blocking plate. The lug nut blocking pad 110 may be a foam or rubber pad having substantially a same size and shape as the lug nut blocking plate 109 to protect a vehicle (e.g., vehicle 500) wheel from damage.

According to an exemplary embodiment of the present invention, the lug nut locking plate 109 may have an octagonal shape, which may prevent the lug nuts from being accessed or tampered with.

According to an exemplary embodiment of the present invention, the horizontal extension portion 105 may be coupled to an internal track 111 formed in the horizontal support arm. The horizontal extension portion 105 may be configured to slide along the internal track 111 to move the rear engagement protrusion 107 to varying distances from the front engagement protrusion 103.

According to an exemplary embodiment of the present invention, a distal end of the horizontal extension portion 105 with respect to the second vertical supporting arm 106 may be concealed within the receiving sleeve 104 when the front engagement protrusion 103 is in contact with the rear engagement protrusion 107.

According to an exemplary embodiment of the present invention, the horizontal support arm 101 may have a first thickness (e.g., first thickness H1 illustrated in FIG. 4) along the direction orthogonal to the upper surface of the horizontal support arm 101. The receiving sleeve 104 may have a second thickness (e.g., second thickness H2 illustrated in FIG. 4) along the direction orthogonal to the upper surface of the horizontal support arm 101. The second thickness may be less than the first thickness.

According to an exemplary embodiment of the present invention, the upper surface of the horizontal support arm 101 may extend along a first horizontal plane (e.g., first horizontal plane 401 illustrated in FIG. 4). An upper surface of the receiving sleeve may extend along a second horizontal plane (e.g., second horizontal plane 402 illustrated in FIG. 4). The first horizontal plane may be spaced apart from the second horizontal plane along the direction orthogonal to the upper surface of the horizontal support arm 101.

According to an exemplary embodiment of the present invention, the first vertical support arm 102 may form a 90° angle with the horizontal support arm 101.

According to an exemplary embodiment of the present invention, a diameter of the lug nut blocking plate 109 may be at least 10 inches. Thus, the lug nut blocking pad 110 may be relatively large to prevent access to and tampering with the underlying lug nuts.

According to an exemplary embodiment of the present invention, a diameter of each of the front engagement protrusion 103 at a first end of the front engagement protrusion 103 opposite the rear engagement protrusion 107 may be at least 2 inches. A diameter of the rear engagement protrusion 107 may taper to 1 inch at a second end of the front engagement protrusion 103 facing the rear engagement protrusion 107.

The disclosures of each of the references, patents and published patent applications disclosed herein are each incorporated by reference herein in their entireties.

In the event of a conflict between a definition herein and a definition incorporated by reference, the definition provided herein is intended.

Having described exemplary embodiments of the present invention, it is further noted that it is readily apparent to those of ordinary skill in the art that various modifications may be made without departing from the spirit and scope of the present invention.

What is claimed is:

1. A vehicle locking boot, comprising:
a base arm;
a first support arm extending vertically from the base arm, wherein the first support arm includes a first engagement protrusion extending therefrom;
a receiving orifice defined in the base arm;
a track formed in the base arm;
an extension portion operably coupled with the track, wherein the extension portion is configured to be slidably received in the receiving orifice by sliding along the track formed in the base arm; and
a second support arm extending from the extension portion, wherein the second support arm includes a second engagement protrusion extending therefrom.

2. The vehicle locking boot of claim 1, further including a lug nut blocking plate coupled to the first support arm.

3. The vehicle locking boot of claim 2, wherein the lug nut blocking plate includes a pad disposed on lug nut blocking plate.

4. The vehicle locking boot of claim 2, wherein the lug nut locking plate has an octagonal shape.

5. The vehicle locking boot of claim 1, wherein the extension portion is configured to slide along the track to move the second engagement protrusion to varying distances from the first engagement protrusion.

6. The vehicle locking boot of claim 1, wherein the first support arm forms substantially a 90° angle with the base arm.

7. The vehicle locking boot of claim 1, wherein the first engagement protrusion faces the second engagement protrusion.

8. The vehicle locking boot of claim 1, wherein the first engagement protrusion is substantially aligned with the second engagement protrusion.

9. The vehicle locking boot of claim 1, further including a keypad disposed on the first support arm.

10. The vehicle locking boot of claim 1, wherein the extension portion is configured to slide horizontally along the track below the first support arm.

* * * * *